United States Patent [19]
Sternberg

[11] 3,713,844
[45] Jan. 30, 1973

[54] DOUGH MAKING METHOD

[76] Inventor: George P. Sternberg, 3740 Wyoming St., Kansas City, Mo. 64111

[22] Filed: July 28, 1970

[21] Appl. No.: 59,021

[52] U.S. Cl. ..................................99/91, 99/90 R
[51] Int. Cl. ................................................A21d 8/04
[58] Field of Search ..........................99/90 R, 91, 93

[56] References Cited

UNITED STATES PATENTS

| | | | |
|---|---|---|---|
| 1,247,349 | 11/1917 | Wahl et al. | 99/90 R |
| 3,167,432 | 1/1965 | Colby | 99/91 X |

*Primary Examiner*—Raymond N. Jones
*Assistant Examiner*—James Robert Hoffman
*Attorney*—Alfred R. Fuchs

[57] ABSTRACT

A method of making dough for bread and roll production in which a warm slurry of flour and malt or other amylase is digested to produce a digested starch product, reducing the bulk of the digested material by evaporation or drying to produce a condensed product which may be either a heavy syrup or a completely dried product which can be ground into a powder. This digested starch product is added to the fermentable dough mixture comprising flour, water, sugar, salt, yeast and other ingredients and mixed therewith. The ferment in the dough can be either obtained from a brew or a sponge that has been fermented. Preferably the dough contains approximately from 2 to 4 pounds of digested starch product to approximately 100 pounds of flour, the amount used can be either added to the usual 100 pounds of flour or can be included as part of the 100 pounds of flour as ordinarily stated in bread and roll dough formulas.

2 Claims, No Drawings

DOUGH MAKING METHOD

When using malt or other amylase in a bread or roll dough it has been the practice to add the malt or other amylolytic material to the dough batch along with the flour, water, sugar, salt and yeast and other ingredients that might be used by the particular baker, the purpose of the amylase being to act on the starch in the flour while the fermentation produced by the yeast acts principally on the gluten in the flour. The dough batch may be either made from a sponge that contains the yeast, part of the flour, and other ingredients, or a brew containing the yeast may be added to the dough ingredients, to obtain the desired fermentation.

A properly fermented sponge or dough will have a slightly acid character indicated by a pH value of from 5 to 5.5. While the acidity of the sponge or dough is desirable for gluten development, such a pH value provides an acid condition that greatly inhibits the amylolytic action of the amylase on the starch.

The dough actually consists of an intimate union of intact starch granules, fragmented starch granules, digested starch granules and filaments of gluten. The digested starch produced from the starch in the flour by the action of the amylase thereon produces good bonding surfaces for the gluten filaments on the starch particles. Such a bonding is highly desirable because of the various processing steps that the dough goes through in being made into a bread loaf or roll, in order to strengthen the cell structure of the dough.

The formation of the digested starch product by action of an amylase on the starch in the flour, is inhibited by the acid condition of the dough mixture so that very little conversion of the starch takes place, during fermentation of the dough or sponge. In order for the digested starch product to be produced in desired quantities it is necessary that the pH value of the sponge or dough is around 7.5. As the pH value of the dough decreases, due to the acidity of the dough, the enzymatic action of the amylases slows and practically stops at a pH value of about 6.

It is, accordingly, a purpose of my invention to increase the production of the digested starch products in a dough batch by acting on a portion of the flour with malt or other amylase to digest the starch therein in a separate step from the fermentation of the dough batch or of the sponge by acting on such portion of the flour with the malt or other amylase separately from the fermentation of the dough batch, and producing a product high in digested starch that can be added to the dough batch either before the fermentation of the sponge or of the dough takes place, or after the fermentation thereof has begun. Thus, while the acidity during fermentation interferes with the production of the digested starch product, it does not in any way have an undesirable effect on the digested starch product added to the dough batch.

It is customary to base all bread and roll formulas on 100 pounds of flour. The starch amounts to approximately 75 percent of the total ingredients in the flour. While the starch is largely a filler, the degree of conversion to digested starch is highly important because of the bonding action resulting from the presence thereof, as above pointed out. Enough of the small particles of starch must be broken down into digested starch, and the dough preferably mixed under conditions of above atmospheric pressure, in order to force the digested starch products and the liquid phase of the dough mixture into the intact starch granules, or through their surface to produce good bonding surfaces for the gluten filaments. Such a proportion of digested starch products can be obtained by my method as to produce much better bonding of the gluten filaments to the starch granules than has been possible under conditions in which the acidity of the dough mixture interfered with such production of the digested starch product by malt or other amylase in the dough mixture.

In carrying out my method a slurry of flour and malt is made which is allowed to digest, preferably at a temperature of between 80° and 100° F., for a period sufficient to produce the amount of digested starch product desired. The slurry can be added directly to the dough mixture after the starch digestion period has passed. Preferably, in order to make the material more readily available for the baker for any particular dough batch, a quantity of the digested flour is produced and is then evaporated or dried to obtain the condensed product, either in the form of a heavy syrup or completely dried and made into a powder form by grinding.

The resulting digested starch product is used, preferably, in a proportion of from 2 percent to 4 percent of the total amount of flour used in the dough. Thus, in a formula requiring 100 lbs. of flour, by my method 98 lbs. of flour and 2 lbs. of the digested starch product is a desirable proportion. However, if it is desired to not change the bread or roll formula, substantially the same result will be obtained by adding the digested starch product to the formula based on 100 lbs. of flour in the same proportion, that is, 2 lbs. of the digested starch product to 100 lbs. of flour in the formula. The exact amount of the digested starch product to be used in the dough will depend on the character of the flour used in the dough and the experience of the baker therewith.

In making the digested starch product a regular baker's type flour should be used which has been subjected to intensive milling damage. This will fractionate or mash most of the starch granules making them vulnerable to amylase digestion. A suitable digested starch product is obtainable by adding 2 lbs. of high strength diastatically active dry barley malt and approximately 50 lbs. of water to 100 lbs. of flour containing such damaged starch granules. The ingredients should be mixed under pressure to aid in the action of the amylase on the starch granules. It is desirable to carry out the digestion of the starch at a temperature between 90 and 100°. The acidity of the ingredient water should be determined and controlled so as to maintain the pH value thereof at from 7.5 to 8.

After a digestion period of said mixture of about 2 hours the mass, which is a stiff mixture, is liquified by the addition of more water, and is screened or sieved to remove undigested starch granules or particles. It can be added to a dough in this condition, but preferably this fluid digested starch material is condensed by evaporation or drying either to a syrup stage or completely dried, whereupon it can be ground so as to produce a powder which can be added to a bread dough formula. The amount by weight of the dried product used in the dough should be from 2 to 4 percent of the flour, usually provided in a bread or roll dough formula.

The digested starch product can be either added to the normal amount of flour used or the flour can be cut down an amount equal by weight to the amount of digested starch product included in the dough.

A typical example of a dough formula to which the digested starch product has been added is:

| | |
|---|---|
| Flour | 100 lb. |
| Water | 60 lb. |
| Digested starch product | 2 lb. |
| Yeast | 3 lb. |
| Yeast food | 0.5 lb. |
| Milk 3 lb. | |
| Shortening | 3 lb. |
| Sugar 7 lb. | |
| Salt | 2 lb. |

If the digested starch product is substituted for an equal weight of flour then the formula would be adjusted as follows:

| | |
|---|---|
| Flour | 98 lb. |
| Water | 59 lb. |
| Digested starch product | 2 lb. |
| Yeast | 3 lb. |
| Yeast food | 0.5 lb. |
| Milk | 3 lb. |
| Shortening | 3 lb. |
| Sugar | 7 lb. |
| Salt | 2 lb. |

The dough can be either made by the fermentation of a sponge and a dough made by adding the proper amount of flour to the sponge, or the ferment for the dough can be obtained by means of a brew made with yeast, sugar and other ingredients. Pressure mixing is desirable both for the making of the slurry that is provided for digesting the starch and for the mixing of the dough, or sponge, or both to better combine the ingredients.

What I claim is:

1. The method of making a bread and roll dough comprising mixing flour containing mostly fractionated starch granules, water and cereal malt in the proportion of approximately 100 parts of said flour, approximately 50 parts water and approximately two parts cereal malt by weight while subjecting said mixture to above atmospheric pressure, digesting the starch in said mixture by means of said cereal malt at a temperature of between 80° F and 100° F and adding the digested product to a dough mixture containing all the other dough ingredients including flour, water and a ferment in the proportion of from approximately two to four parts of said digested product to approximately 100 parts by weight of the flour in said dough mixture.

2. The method of making an additive to a bread and roll dough comprising mixing flour containing mostly fractionated starch granules, water and cereal malt in the proportion of approximately two parts cereal malt to approximately 50 parts water and approximately 100 parts of said flour by weight, while subjecting said mixture to above atmospheric pressure and digesting the starch in said mixture at a temperature of between 80° F and 100° F to produce said additive.

* * * * *